Feb. 9, 1932.  M. A. STICELBER  1,843,960

ENGINE CONTROL SYSTEM

Filed Jan. 10, 1931

Inventor
Merlin A. Sticelber
By Luther Johns
Atty.

Patented Feb. 9, 1932

1,843,960

UNITED STATES PATENT OFFICE

MERLIN A. STICELBER, OF KANSAS CITY, MISSOURI, ASSIGNOR TO THE NAFZIGER CORPORATION, OF KANSAS CITY, MISSOURI, A CORPORATION OF MISSOURI

ENGINE CONTROL SYSTEM

Application filed January 10, 1931. Serial No. 507,808.

Figure 1:
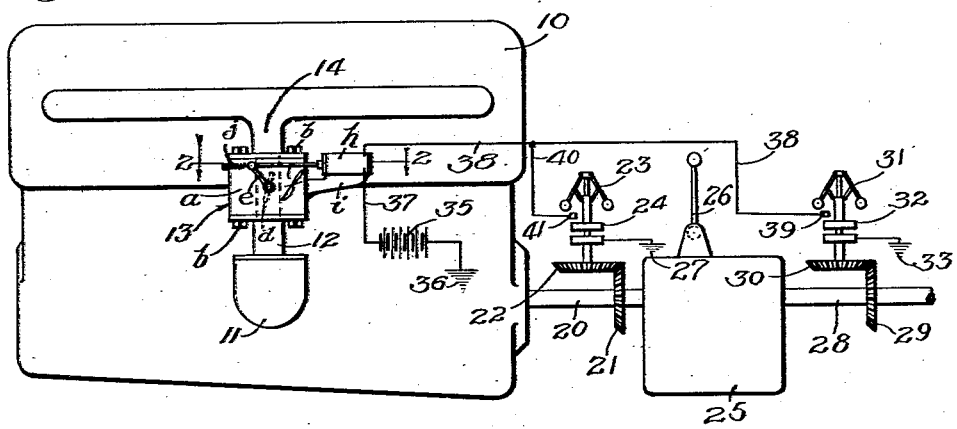
Figure 2:
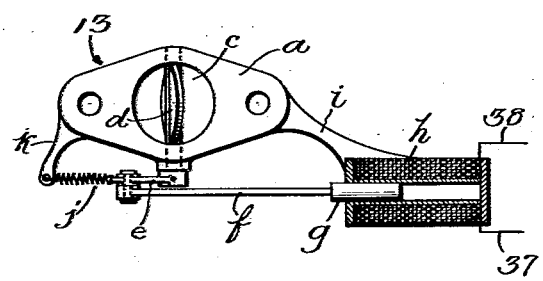

In Fig. 1 shaft 20 is the engine shaft and therefore operates at engine speed. For purposes of diagrammatic illustration I have shown on shaft 20 a bevel gear 21 which meshes with a similar gear 22 supplying rotative power to governor means 23 shown conventionally as of the fly-ball type, the contact disc 24 of which is to be understood as moving upward as the speed of governor 23 increases.

The device 25 is to be understood as being the usual transmission of the automobile containing any well-known or approved arrangement of shafts and gearing by which the speed of output shaft 28 may be varied relative to that of engine shaft 20, the various speeds being controlled by gear-shift lever 26. The output speeds from the transmission are ordinarily called "low", "intermediate" and "high"; but there may be more intermediate speeds than one. The "high" speed of shaft 28 is the same as that of shaft 20.

On output shaft 28 I have shown for purposes of illustration a bevel gear 29 which meshes with a similar gear 30 rotating the governor means 31 having the contact disc 32 moving up and down in accordance with the variations in the speed of shaft 28.

The system thus far described includes a prime mover with means for delivering to it a controllable supply of energy for operating it, in the instance illustrated this supply of energy being gaseous fuel, the engine having an element, namely shaft 20 or gear 21, rotating in accordance with the speed of the prime mover, governor means under the control of that element, a transmission or speed-varying device in driven relation to the prime mover, being driven by shaft 20, with an element driven by the speed-varying device, namely shaft 28 or gear 29, in accordance with the various relative speeds delivered by the speed-varying device, and governor means under the control of the variable speed element as 28 or 29.

There are many different well-known types and forms of governors suitable for the purpose and having adjustable means for making and breaking a circuit at various rates of governor rotation. The governors illustrated herein are to be understood as being merely diagrammatic and as having such features of adjustment for the circuit contacts.

It is to be understood that in an automobile output shaft 28 communicates rotative motion to the driving wheels. Shaft 28 therefore rotates in accordance with the vehicle speed, while shaft 20 rotates in accordance with the engine speed.

The means for operating valve $d$ to control the fuel are shown as an electrical system which comprises first the battery 35 grounded at 36 with a wire connection 37 leading to solenoid $h$. From the solenoid wiring conductor 38 leads to contact 39 which is normally spaced from the disc or contact maker 32, this governor device 31 being grounded at 33.

When the speed of shaft 28 rises to some predetermined rate, for example that which causes the vehicle to travel at say thirty miles per hour, contact is made between the elements 32 and 39. A circuit is thereby completed through solenoid $h$, the effect of which is to draw valve $d$ into its closed position, thereby cutting off the fuel and immediately reducing the speed of the vehicle. When the vehicle speed slows down below the predetermined rate of say thirty miles per hour, the contact is broken at 32 and 39, the magnet is thereby de-energized, and spring $j$ draws the valve open. According to these means under the control of shaft 28 the vehicle speed may not rise higher than the predetermined rate.

It is not new to provide means under the control of the vehicle speed for cutting off or limiting the fuel supply when the vehicle speed reaches a predetermined rate.

A conductor 40 is tapped into conductor 38 and leads to contact maker 41 associated with governor 23 grounded at 27. When the engine speed rises to a predetermined rate contact is made between elements 24 and 41 and a circuit is completed from battery 35 through solenoid $h$, with the result that valve $d$ is closed, cutting off the fuel supply and reducing the speed of the engine and thereby the speed of the vehicle.

It is not new to cut off or limit the fuel supply by governor means operating under the control of the speed of the engine.

So far as I am aware, however, it is new at this time to provide a dual control for the engine, through its fuel or other energy supply, whereby when either the engine speed or the vehicle speed reaches its predetermined rate the fuel or other energy for the prime mover will be cut off or limited, whereby the engine speed and the vehicle speed are severally and independently prevented from rising higher than the predetermined rate established for each by the adjustment of the governor means respectively.

The importance of my novel system will be apparent from some observations upon the conditions attending the use of such automobiles as delivery trucks, in connection with which the present system finds its most advantageous application at this time. These trucks, being large, heavy and unwieldy, are far more dangerous to themselves and to other vehicles and to pedestrians on the road than are the lighter or passenger cars. They are more difficultly controlled because of their great weight and general character. It appears also that the drivers of these trucks are not particularly careful operators. It is recognized as being highly desirable, therefore, that means be provided for controlling the speed of their operations, and it has been suggested theretofore to control the operating speed either by means under the control of the vehicle speed or by means controlled by the engine speed. I have heretofore employed both of these means, separately, in an effort to obtain the desired result of a safe operation of the truck, but found therein various objections and disadvantages, at least some of which I may point out.

When single speed-limiting means are provided and they are under the control of the engine speed, as governor 23, the governor means must be so adjusted that the desired vehicle speed of say thirty miles per hour can be obtained with the truck carrying its full load. This means that when the truck is running light or empty it may develop a speed of say forty to fifty miles per hour, and since the trucks are running light or empty upwards of half of the time the dangerous condition is not avoided.

On the other hand, where the engine is controlled only by governor means as 31, namely according to the vehicle speed, such conditions as these are found: The operator wants to make all the speed possible up-hill or on the long inclines which may constitute a large part of the run. He knows he can not make say thirty miles per hour in "high", so he goes to "intermediate" or "low" and races the engine. Then too he may find the going rather hard in high, owing to heavy roads coupled with a heavy load, and he may shift into intermediate or low in order to make all possible speed, running the engine at some excessive rate.

The result of these high engine speed operations is very harmful to the engine and, furthermore, it results in a great wastage of fuel.

As is well known, internal combustion engines reach their respective peaks of efficiency at some given rate of operation. We may assume in a given case that an engine speed of two thousand revolutions per minute will afford the maximum horse power efficiency. The engine should not be run at a higher rate than that for the sake of economy of fuel, but it should not be run at any excessive rate because of the extreme wear and tear involved. Accordingly the engine should be controlled so that it may not reach a destructive or harmful rate.

For purposes of this description we may assume that governor means 23 are so adjusted that when engine shaft 20 is turning at its best efficiency rate of two thousand revolutions per minute contact will be made between elements 24 and 41 and cut off or reduce the fuel supply temporarily until the vehicle slows down a trifle. These governor means 23 therefore insure the safety and well-being of the engine and guard against such improper practices as have been pointed out, while still rendering available all of the power that the engine will develop.

Assuming engine-speed governor 23 to be set to make contact at say two thousand revolutions per minute unless we add governor means functionally such as 31 the speed of the vehicle would greatly exceed the prescribed or adopted rate of say thirty miles per hour. We therefore need also a governor under the control of the vehicle speed. When the driver operates carefully and properly the governor 23 seldom comes into play, but it will sometimes do so, even with a careful driver under certain conditions. For example, he may be trying to pull out of a rut or ditch. He will shift to intermediate or low and his disposition will be to give the engine all of the fuel possible. He is not able to determine when he has reached the efficiency peak of the engine and probably never heard of such a peak. He rather naturally assumes that the more fuel he supplies the more traction he will obtain. The present system therefore will save the engine under such and other conditions, and without detracting from the operator's ability to use all the power at his command. These truck drivers are not ordinarily very careful or considerate operators, and the savings in fuel and engine destruction effected by this system are very great.

Both governor means as 23 and 31 may be adjusted so as to operate at closely approximating the same rate, especially in passenger vehicles where the traveling speed should be much higher than for trucks. For example, both the road speed governor and the engine governor may be set to operate at stages representing a vehicle speed of about fifty miles per hour, and we will assume that fifty miles per hour for that vehicle would be represented by a speed of say twenty one hundred revolutions per minute, with two thousand revolutions per minute indicating the maximum horse power of the engine. In other words we may permit the engine to run a little higher than it should run for efficiency as a slight concession in favor of road speed, although still maintaining the operation of the engine at a safe rate.

According to the present system I accomplish highly important results which are distinctly novel in kind over those of all prior suggestions of which I am aware. Those skilled in the art will appreciate still other advantages than those mentioned herein, and also the applicability of the system to other prime movers, such as steam and electric engines, etc.

I contemplate as being included in these improvements all such changes, variations and departures from what is thus specifically illustrated and described as fall within the scope of the appended claims.

I claim:

1. A control system for a power plant having a prime mover adapted to provide rotary motion, means for delivering a controllable supply of energy to the prime mover for operating same, an element rotating in accordance with the speed provided by the prime mover, a speed-varying device in driven relation to the prime mover, and an element rotated by the speed-varying device in accordance with the various relative speeds thereof, said system comprising governor means under the control of said element rotating in accordance with the prime mover speed, governor means under the control of said element driven by the speed-varying device, and means under the control of each of said governor means for varying the supply of energy delivered to the prime mover by said energy-supplying means.

2. A control system for a power plant having an internal combustion engine adapted to provide rotary motion, means for delivering a controllable supply of fuel to the engine for operating same, an element rotating in accordance with the engine speed, a speed-varying device in driven relation to the engine, and an element rotated by the speed-varying device in accordance with the various relative speeds thereof, said system comprising governor means under the control of said element rotating in accordance with the engine speed, governor means under the control of said element driven by the speed-varying device, and means under the control of each of said governor means for varying the supply of fuel delivered to the engine by said fuel-supplying means.

3. A control system for a power plant having an internal combustion engine adapted to provide rotary motion, means forming a passageway for a controllable supply of fuel to the engine for operating same, an element rotating in accordance with the engine speed, a speed-varying device in driven relation to the engine, and an element rotated by the speed-varying device in accordance with the various relative speeds thereof, said system comprising governor means under the control of said element rotating in accordance with the engine speed, governor means under the control of said element driven by the speed-varying device, valve means in said fuel passageway for controlling the fuel supply to the engine, electrical means for operating said valve, and electrical circuit means under the control of each of said governor means for operating said valve to control the fuel supply.

MERLIN A. STICELBER.